United States Patent [19]

Wortman et al.

[11] Patent Number: 4,571,726
[45] Date of Patent: Feb. 18, 1986

[54] HIGH PERFORMANCE OROTRON UTILIZING A DENSE ELECTRON BEAM

[75] Inventors: Donald E. Wortman, Rockville; Richard P. Leavitt, Berwyn Heights, both of Md.

[73] Assignee: The United States of America as represented by the Secretary of the Army, Washington, D.C.

[21] Appl. No.: 595,210

[22] Filed: Mar. 30, 1984

[51] Int. Cl.$^4$ .............................................. H01S 3/00
[52] U.S. Cl. .......................................... 372/2; 372/9; 372/20; 315/3.6; 315/4; 315/5
[58] Field of Search .................... 372/2, 9, 14, 15, 20, 372/32, 99, 98, 102; 315/3, 4, 5, 3.6

[56] References Cited

PUBLICATIONS

Wortman et al., "Millimeter-Wave Orotron Oscillation-Part II: Exp."; IEEE Jour. Quant. Elect., vol. QE-17, No. 8, Aug. 1981.
Wortman et al., "Improved Orotron Performance in the 50 to 75 GHz Freq. Region"; IEEE Transact. on Electron. Devices, vol. ED-29, No. 10, Oct. '82.
Leavitt et al., "Effects of Space Charge on the Performance of an Orotron"; J. Appl. Phys. 54(5), May 1983.
Spindt; "Spindt Cold Cathode Electron Gun Development"; NASA Report No. CR-168212, May 1983.

Primary Examiner—William L. Sikes
Assistant Examiner—Léon Scott, Jr.
Attorney, Agent, or Firm—Saul Elbaum; Thomas E. McDonald; Anthony T. Lane

[57] ABSTRACT

A method and apparatus for increasing the power output and efficiency of an orotron generating near millimeter wavelength radiation. In accordance with a theory of orotron operation described herein and confirmed experimentally, the ribbon-like electron beam utilized in the orotron has a very high current density to effect a large increase in orotron output power and efficiency due to space-charge effects in the beam. In the preferred embodiment, the high density electron beam is generated by a closely-packed rectangular array of field-emission cathodes.

12 Claims, 5 Drawing Figures

HIGH PERFORMANCE OROTRON UTILIZING A DENSE ELECTRON BEAM

RIGHTS OF THE GOVERNMENT

The invention described herein may be manufactured, used, and licensed by or for the U.S. Government for Governmental purposes without payment to us of any royalty thereon.

BACKGROUND OF THE INVENTION

The invention relates generally to a method and apparatus for generating coherent near-millimeter wave radiation. More particularly, the invention relates to a method and apparatus for improving the efficiency of a Smith-Purcell free-electron laser, or orotron.

In an orotron, a ribbon-like electron beam is directed over a metallic reflecting diffraction grating embedded in a mirror which, along with another mirror, forms an open resonator. This resonator reflects the radiation emitted by the electron beam back into the beam, causing the electrons therein to bunch. If the proper conditions of synchronism between the electron beam velocity and the phase velocity of an evanescent wave traveling along the grating are met, coherent radiation will result.

In orotrons and orotron-like devices developed in the U.S.S.R. and Japan, a convergent electron gun has been used with a beam focusing magnetic field to produce ribbon-like electron beam having an electron beam density in the range of 20 to 30 amperes per square centimeter. However, until now, all electron guns for orotrons have utilized conventional thermionic cathodes which require cathode heater sources.

Prior to the present invention, the effects of mutual electronic repulsion in the electron beam in an orotron (space charge effects) had not been considered in theoretical models for orotrons developed in the U.S.S.R. and in this country. Space-charge effects appeared to have negligible effect on the efficiency of an orotron, since published test data indicated that the orotron output was almost a linear function of the beam current. For example, in an article by F. S. Rusin and G. D. Bogomolov entitled "The Orotron, An Electronic Device With An Open Resonator And A Reflecting Grating", published in Izvestiya VUZ. Radiofizika, Vol. 2, No. 5, pp. 758-762, 1968, the results of tests performed on an orotron to determine the orotron power as a function of beam current were published. These tests indicated that the prior output of the orotron depended almost linearly on the beam current over a wide range.

SUMMARY OF THE INVENTION

It is an object of the invention to provide a method of increasing the power output and efficiency of an orotron.

It is another object of the invention to provide an orotron having higher efficiency than theretofor obtainable.

It is a further object of the invention to provide an "instant-on" orotron.

When the theory of orotron operation was extended to include space-charge effects, and calculations made to determine starting current, output power, and efficiency, it was found that the maximum power output of an orotron should vary as the square of the beam current, rather than linearly with the beam current as indicated by prior published test data. Calculated values of maximum prior output and efficiency were in good agreement with test results obtained by modifying an existing orotron to increase the average current density.

Thus, the power output and efficiency of an orotron can be greatly increased merely by increasing the current density of its electron beam. For example, the highest electron beam density of orotrons currently being used to generate near millimeter wave radiation does not exceed 30 amperes per square centimeter. Thus, by merely increasing the current density to 60 amperes per square centimeter, the power output of these orotrons can be increased by a factor greater than four.

There are two methods which are suitable for producing a dense electron beam in an orotron. One method is simply that of providing a lens to converge the electron beam to high densities. A shaped magnetic field would be a suitable lens. A more desirable method of producing a dense ribbon-like beam of electrons is by means of a thin-film, closely packed, rectangular array of field emitters, which does not require a cathode heater source as do thermionic cathodes. The use of such field-emission cathode arrays allows "instant-on" devices which can be made lighter in weight for possible use in satellites as well as numerous other military and civilian applications.

BRIEF DESCRIPTION OF THE DRAWINGS

The invention will be better understood, and further objects, features and advantages thereof will become more apparent from the following description of the preferred embodiments, taken in conjunction with the accompanying drawings in which.

DESCRIPTION OF PREFERRED EMBODIMENTS

Figure 1:
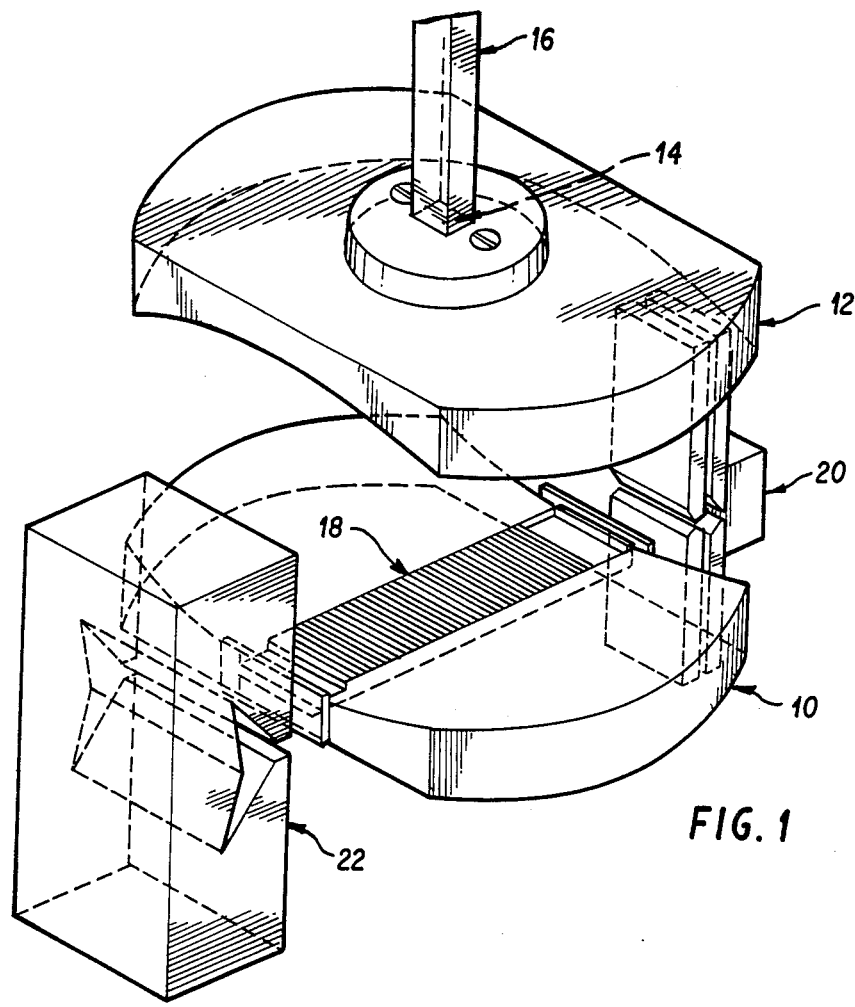
FIG. 1 is a perspective view of a typical orotron.
Figure 2:
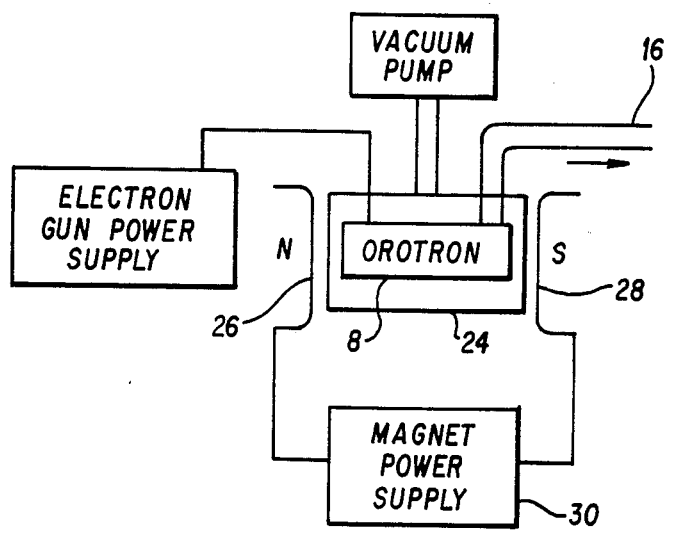
FIG. 2 is a block diagram of a circuit including the orotron of FIG. 1.

FIG. 1 shows a perspective view of a 50 to 75 GHz orotron developed at the Harry Diamond Laboratories, Adelphi, MD. The open resonator of the orotron is formed by a semicylindrical lower mirror 10 and a semispherical upper mirror 12 having a central opening 14 coupled to an output wave guide 16. The reflecting surfaces of the two mirrors 10, 12 may be metallic, or alternately, may be composed of dielectric materials, similar to that described in U.S. Pat. No. 4,286,230, issued Aug. 25, 1981 to Morrison et al. A metallic reflecting diffraction grating 18 is embedded in the lower mirror 10. An electron gun 20 for generating a ribbon-like electron beam is disposed at one end of the diffraction grating 18, and an electron collector 22 for receiving the electron beam is disposed at an opposite end of the grating 18. As shown in the circuit of FIG. 2, the orotron 8 is disposed within a vacuum chamber 24 between the north and south pole pieces 26, 28 of a magnetic power supply 30 which provides a magnetic field to guide the electron beam generated by the electron gun 20 over the diffraction grating 18.

During operations of this orotron, a ribbon-like electron beam generated by the electron gun 20 passes over the surface of the metallic diffraction grating 18 and radiates in a mode of the open resonator formed by the two mirrors 10, 12. The radiation from the resonator is then fed back onto the beam, causing the electrons to bunch together. If the proper conditions of synchronism are met between the electron velocity and the phase velocity of a slow wave propagating along the grating surface, the orotron will radiate coherently at a frequency near one of the resonant frequencies of the open resonator.

The theory of operation and experimental results for this HDL orotron are presented in a two part article by Leavitt, Wortman, and Dropkin entitled "Millimeter-wave Orotron Oscillation", published in the IEEE Journal of Quantum Electronics, Vol. QE-17, No. 8, August 1981, pp. 1333–1348. However, for a sufficiently high beam intensity, the tenuous-beam analysis presented in this article is inadequate to fully describe the physics of orotron oscillations; for such high current densities, the effect of space-charge must be taken to account.

In an article by Gover and Sprangle entitled "A Unified Theory of Magnetic Bremsstrahlung, Electrostatic Bremsstrahlung, Compton-Raman Scattering, and Cerenkov-Smith-Purcell Free-Electron Lasers", published in the IEEE Journal of Quantum Electronics, Vol. QE-17 No. 7, July 1981, a general analysis of free-electron lasers is presented, in which space-charge, finite beam temperature, and strong coupling between the beam and the periodic structure are included. The formalism presented in this article is applied herein to the orotron to determine the effects of space-charge on its performance.

In the cold-beam, weak-coupling limit described by Gover and Sprangle, collective modes on the electron beam with wave vectors $k_\pm = (\omega \pm \omega_p)/v$ interact resonantly with the periodic structure of the orotron, where $\omega$ is the angular frequency of the radiation, $\omega_p$ is the plasma frequency of the beam, given by $$\omega_p = \left[ \frac{Je}{\epsilon_0 m v} \right]^{\frac{1}{2}}, \quad (1)$$

and v is the electron beam velocity. In Eq. (1), J is the beam current density, e is the magnitude of the electron charge, m is the electron mass, and $\epsilon_0$ is the vacuum permittivity.

The resonator mode of the orotron behaves as a Gaussian along the direction of electron propagation, i.e.

$$E(y) \sim \exp(-y^2/w^2). \quad (2)$$

It is useful to define a normalized parameter $\overline{\theta}_p$ describing the extent of space-charge effects:

$$\overline{\theta}_p = \frac{\omega_p w}{v} = 0.02715 \, J(A/cm^2)^{\frac{1}{2}} \, w(cm) \, \beta^{-3/2}, \quad (3)$$

where $\beta = v/c$. The gain of the orotron is proportional to $f(\overline{\theta} - \overline{\theta}_p) - f(\overline{\theta} + \overline{\theta}_p)$, where $f(u) = \exp(-u^2/2)$ and where $\overline{\theta}$ is a resonance mismatch parameter given be $$\overline{\theta} = \frac{w}{l} \left( \frac{\omega l}{v} - 2\pi \right), \quad (4)$$

where l is the grating period. Thus, we may write the gain as $$g(\overline{\theta}) = -\frac{1}{\overline{\theta}_p} \exp[-(\overline{\theta}^2 + \overline{\theta}_p^2 - 1)/2] \sinh(\overline{\theta}\overline{\theta}_p). \quad (5)$$

The orotron oscillates at that value of $\overline{\theta}$ for which the gain is maximum:

$$\frac{dg}{d\overline{\theta}} = 0.$$

(Note that $\overline{\theta}_{max} < 0$.)

Figure 3:
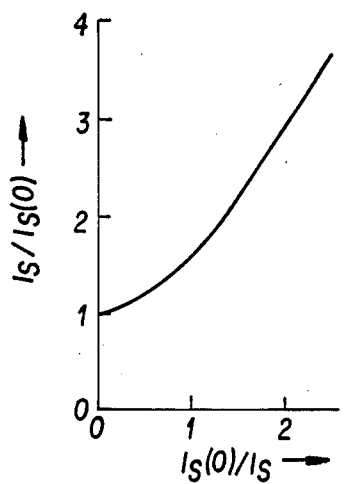
FIG. 3 is a curve showing the increase in an orotron starting current due to space-charge effects as a function of $I_s(0)/I_0$.

The above formalism may be used to calculate the change in the orotron starting current due to space-charge effects. We define $I_0 = \epsilon_0 m v^3 A/e\omega^2$, or $$I_0(mA) = 1.356 \times 10^6 \frac{\beta^3}{w(cm)^2} A(cm^2), \quad (6)$$

where A is the beam cross-sectional area. We assume a start-oscillation beam current $I_s$, and determine $\overline{\theta}_p = (I_s/I_0)^{\frac{1}{2}}$. The maximum gain is calculated from Eq. (5); this gain should be equal to $I_s(0)/I_s$, where $I_s(0)$ is the starting current calculated assuming no space charge. This latter condition can be met only at a particular value of $I_s$ and allows the self-consistent determination of the starting current. Results of the calculations can be represented on a single curve (FIG. 3) showing the increase in the starting current due to space-charge effects, $I_s/I_s(0)$, as a function of $I_s(0)/I_0$. For the HDL 75 GHz orotron, $\beta = 0.1$, $w = 1$ cm, and $A = 0.03$ cm$^2$; thus, from Eq. (6), $I_0 = 40.7$ mA. Also, as shown in an article by Leavitt, Wortman and Morrison entitled "The Orotron-A free-electron laser using the Smith-Purcell effect", Appl. Phys. Lett. 35, page 364 (September 1979), $I_s(0) = 34.5$ mA, and from FIG. 1 we get $I_s/I_s(0) = 1.51$, yielding $I_s(0) = 52.2$ mA. This result agrees well with experimental measurements reported in the above-referenced two-part article by Leavitt, Wortman and Dropkin.

Gover and Sprangle suggest that, in the cold-beam, weak-coupling limit discussed here, the single-electron efficiency should be augmented by a factor of $\overline{\theta}_p$ if $\overline{\theta}_p >> 1$. In the absence of space-charge effects, the maximum power obtainable form the orotron for a given beam current I is given by $$P_{max} = KI^{4/3}, \quad (7)$$

where, for the HDL orotron, $K = 11.389 \times 10^{-3}$ (if I is in mA and $P_{max}$ is in W). If the single-electron efficiency is multiplied by $\overline{\theta}_p$, then we obtain $$P_{max} = K\overline{\theta}_p^{4/3} I^{4/3}, \quad (8)$$

or $P_{max} \propto I^2$ (since $\overline{\theta}_p \propto I^{\frac{1}{2}}$). At beam currents of 200 mA, 750 mA, and 1.5 A (current densities of 6.67 A/cm$^2$, 25 A/cm$^2$, and 50 A/cm$^2$), Eq. (7) yields $P_{max} = 1.62$ W, 9.47 W, and 23.8 W, respectively. In contrast, Eq. (8) yields 4.70 W, 66.0 W, and 264 W, respectively, for the same beam currents. The corresponding efficiencies are 0.94%, 3.5%, and 7.0% for the latter calculations. Thus, space-charge effects lead to a significant enhancement in the experimental result: approximately 5 W obtained at 200 mA with the HDL orotron, as reported in an article by Wortman, Leavitt and Dropkin entitled "Improved Orotron Performance in the 50- to 75-GHz Frequency Region, IEEE Transactions on Electron Devices, Vol. ED-29, No. 10 (October 1982).

Figure 4:
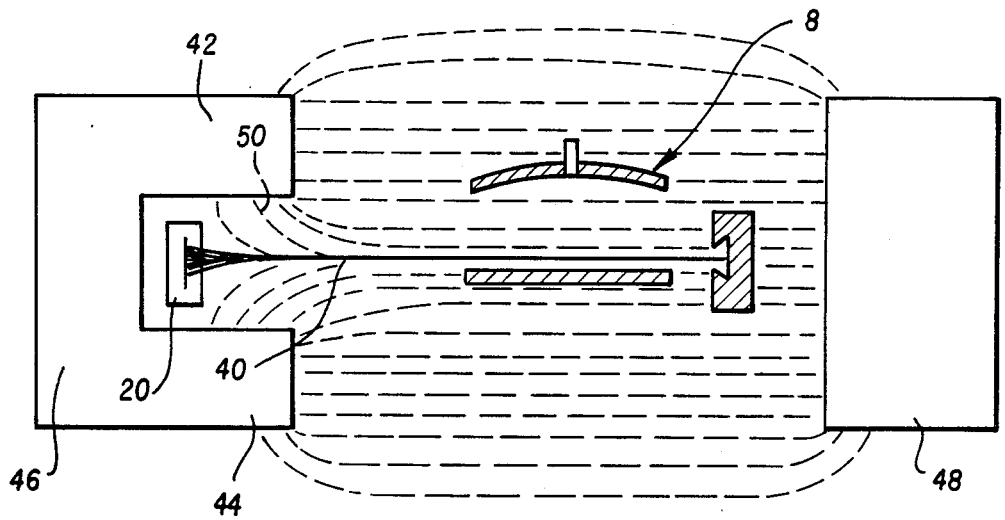
FIG. 4 is a simplified view of a magnetic field assembly for converging the electron beam of an orotron to a high density.

One method which can be used in orotron to produce much denser electron beams than have been utilized in the past, for example, electron beams having a density of 60 amperes per square centimeter or greater, is to utilize a shaped magnetic field as a lens to converge the electron beam to a very high density. For example, as shown diagramically in FIG. 4, the electron gun 20 for generating a ribbon-like electron beam 40 can be disposed between two portions 42, 44 of one polarity magnetic pole piece 46 and the electron beam 40 directed through the orotron 8 toward an opposite polarity magnetic pole piece 48. The lines of magnetic flux 50 extending between the magnetic poles pieces 46, 48 act upon the electron beam 40 adjacent the electron gun 20 to converge the beam to a high current density.

A more desirable method of producing a dense ribbon beam of electrons in an orotron utilizes a thin-film, closely packed, rectangular array of field emitters, similar to that described in NASA report no. CR-168212, published May, 1983, entitled "Spindt Cold Cathode Electron Gun Development Program". This NASA report describes an anisotropic dry etching process (reactive ion beam etching) which can be used to greatly increase the packing density of emitter tips in a field-emission cathode array. Tests made on small arrays of emitter tips having about ten tips have demonstrated current densities of over 100 amperes per square centimeter using cathodes having a packing density of $1.25 \times 10^6$ tips per square centimeter. The type of field-emission cathode array described in this report should be particularly suitable for producing cathodes of high aspect ratios (width and thickness) that are required in orotron type devices. Thus, such field effect cathodes can be utilized in future orotrons to provide beams of sufficient current densities (exceeding 60 amperes per square centimeter) that utilize the space-charge effects described above to greatly increase the power output and efficiency of these orotrons.

In addition to providing an order of magnitude greater power and efficiency from orotron type devices, the field emitter cathodes have the further advantage in that they do not require a cathode heater source as do conventional thermionic cathodes. Thus, orotrons employing such field-emission cathode arrays to generate the ribbon-like electron beam will be light weight, "instant-on" devices having numerous military and civilian applications.

Figure 5:
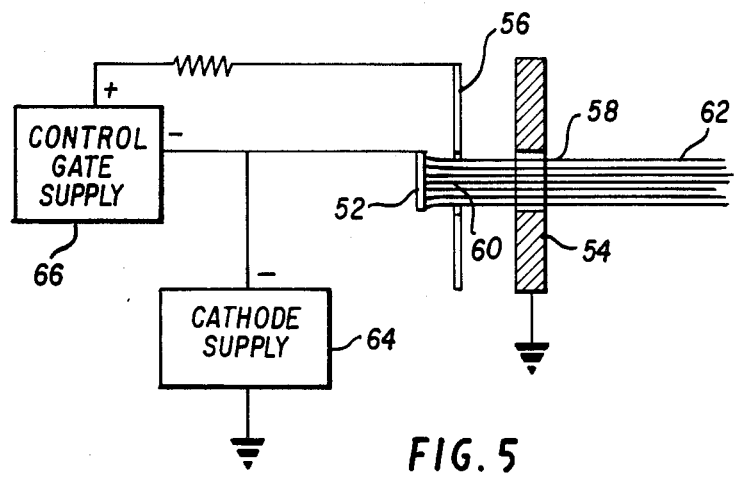
FIG. 5 is a schematic diagram of an orotron electron gun utilizing a thin-film field-emission cathode array.

FIG. 5 shows a block diagram for an electron gun 50 of an orotron which utilizes a thin-film, closely packed, rectangular, field-emission cathode array 52 to generate a ribbon-like electron beam having a very high current density. The electron gun includes a grounded anode 54 and a control gate 56 disposed between the anode and the cathode array 52. The anode 54 and the control gate 56 include respective rectangular openings 58, 60 to allow passage of the ribbon-like electron beam 62 generated by the field emission cathode array 52. The cathode array 52 is energized by a high positive voltage (approximately 5000 volts) provided by a cathode supply 64. A separate, variable voltage supply 66 is utilized to provide a voltage to control gate 56 which is positive relative to the voltage supplied to the cathode array 52. The voltage applied to the control gate controls the electron beam current, and the voltage applied to the cathode array 52 controls the electron velocity, $v_o$. The frequency f of the device, is $f = v_o/l$, as for all orotrons, where l is the period of the diffraction grating 18.

The invention described herein thus provides a means to obtain high power, high performance orotrons via the use of space-charge effects not previously recognized as useful. There are many uses for such a high power, high efficiency orotron. For example, an orotron operating and tunable from 94 to 140 GHz would be very useful in tactical battlefield scenarios in the presence of obscurants. No other known system of radiation in this frequency range has the tunability and mode purity as the orotron. In addition to military applications, such as radar systems and electronic countermeasure systems, such high power, high efficiency orotrons can also be applied in such fields as spectroscopy, plasma diagnostics, and satellite studies.

As various modifications, variations, and additions to the specific embodiments to the invention described herein are possible, it is intended that the scope of the invention be limited only by the appending claims.

What is claimed and desired to be secured by Letters Patent of the United States is:

1. An orotron for generating coherent near millimeter wavelength radiation, which comprises:
   an open resonator formed by a first mirror and a second mirror which is spaced from the first mirror, the first mirror including a reflecting diffraction grating facing the second mirror;
   beam forming means for generating a high density, ribbon-like electron beam having an average current density of at least 60 amperes per square centimeter; and
   beam directing means for directing the electron beam across the diffraction grating at a velocity selected to generate coherent radiation within the open resonator.

2. An orotron, as described in claim 1, wherein said beam forming means comprises a closely-packed, rectangular array of thin-film field-emission cathodes.

3. An orotron, as described in claim 1, wherein said beam forming means comprises:
   means for generating a first ribbon-like electron beam; and
   magnetic focusing means for generating a shaped magnetic field to converge the first electron beam and form therefrom said high density ribbon-like electron beam.

4. An orotron, as described in claim 1, wherein said second mirror comprises a concave reflecting surface which is essentially semispherical in shape.

5. An orotron, as described in claim 4, wherein said first mirror comprises a concave reflecting surface which is essentially semicylindrical in shape.

6. An orotron for generating coherent near millimeter wavelength radiation, which comprises:
   an open resonator formed by a first mirror and a second mirror which is spaced from the first mirror, the first mirror including a reflecting diffraction grating facing the second mirror;
   beam forming means, including a closely-packed, rectangular array of thin-film field-emission cathodes, for generating a high density, ribbon-like electron beam; and beam directing means for directing the electron beam across the diffraction grating at a velocity selected to generate coherent radiation within the open resonator.

7. An orotron, as described in claim 6, wherein the beam forming means further comprises magnetic means for generating a magnetic field to converge a ribbon-like electron beam generated by the array of field-emission cathodes and form therefrom said high density, ribbon-like electron beam.

8. An orotron, as defined in claim 6, wherein said second mirror comprises a concave reflecting surface which is essentially semispherical in shape.

9. An orotron, as described in claim 8, wherein said first mirror comprises a concave reflecting surface which is essentially semicylindrical in shape.

10. A method for generating coherent near millimeter wavelength radiation, which comprises the steps of:
   generating a high density ribbon-like electron beam having a current density of at least 60 amperes per square centimeter; and
   directing the high density electron beam over a reflecting diffraction grating embedded in a first mirror which, together with a second mirror spaced from the first mirror, forms an open resonator, the high density electron beam being directed at a velocity selected to generate coherent radiation within the open resonator.

11. A method, as described in claim 10, wherein the step of generating said high density ribbon-like electron beam comprises the steps of:
   generating a first ribbon-like electron beam; and
   magnetically converging the first ribbon-like electron beam to form said high density ribbon-like electron beam.

12. A method for generating coherent near millimeter wavelength radiation, which comprises the steps of:
   electrically energizing a rectangular array of closely-packed, thin-film, field-emission cathodes to generate a high density, ribbon-like electron beam; and
   directing the high density electron beam over a reflecting diffraction grating embedded in a first mirror, which, together with a second mirror spaced from the first mirror, forms an open resonator, the high density electron beam being directed at a velocity to generate coherent radiation within the open resonator.

* * * * *